US012794955B2

(12) United States Patent
Lukac et al.

(10) Patent No.: US 12,794,955 B2
(45) Date of Patent: Nov. 10, 2026

(54) METHOD FOR ROUTING INITIATION PROTOCOL MESSAGES FROM CORE SESSION MANAGER (SM) TO BRANCH SM THROUGH SESSION BORDER CONTROLLER

(71) Applicant: Avaya Management L.P., Santa Clara, CA (US)

(72) Inventors: Tibor Lukac, Palm Beach Gardens, FL (US); Pritesh Mistry, Pune (IN)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 19/070,119

(22) Filed: Mar. 4, 2025

(65) Prior Publication Data

US 2026/0270305 A1 Sep. 10, 2026

(51) Int. Cl.
*H04L 65/1104* (2022.01)
*H04L 61/5007* (2022.01)

(52) U.S. Cl.
CPC ...... *H04L 65/1104* (2022.05); *H04L 61/5007* (2022.05)

(58) Field of Classification Search
CPC ......................... H04L 65/1104; H04L 61/5007
See application file for complete search history.

(56) References Cited

U.S. PATENT DOCUMENTS 9,167,041 B2 * 10/2015 Almog ................ H04L 65/1069
2009/0052434 A1 * 2/2009 Jackson .................. H04L 12/66 370/352
2011/0026440 A1 * 2/2011 Dunn ................... H04M 3/5116 370/259
2013/0031257 A1 * 1/2013 Klein .................. H04L 65/1016 709/227
2013/0246846 A1 * 9/2013 Oyman ............... G06F 11/1402 714/18
2016/0261689 A1 * 9/2016 Jackson .............. H04L 61/5007
2023/0169366 A1 * 6/2023 Renehan ................ G06N 3/044 706/12
2024/0143323 A1 * 5/2024 Sun ......................... G06F 9/547

FOREIGN PATENT DOCUMENTS

EP 2132879 B1 * 5/2022 ......... H04L 65/1089
WO WO-2021014204 A1 * 1/2021 ......... H04L 63/0428

* cited by examiner

*Primary Examiner* — Javier O Guzman

(57) ABSTRACT

Embodiments provide methods and systems for providing communication sessions between components that are in different environments. The methods and systems include receiving a Session Initiation Protocol (SIP) connection request from a first communication device of a first network to establish a connection between the first communication device and a second communication device of a second network, retrieving an identifier provided in a route header of the SIP connection request identifying the second communication device of the second network, receiving a SIP request from the second communication device to the first communication device, and establishing a communication between the second communication device and the first communication device using the identifier mapped with a channel providing the connection between the first communication device and the border element.

20 Claims, 8 Drawing Sheets

METHOD FOR ROUTING INITIATION PROTOCOL MESSAGES FROM CORE SESSION MANAGER (SM) TO BRANCH SM THROUGH SESSION BORDER CONTROLLER

The present disclosure is generally directed to communications and more particularly, towards systems and methods for providing communication sessions between components that are in different environments.

BACKGROUND

Exchanges of media (e.g., messages) may occur in various types of communication sessions such as voice calls, video calls, voice and/or video conferences, etc. These exchanges can also be made across different types of networks. For example, a voice or video call or conference call can be established and conducted on a closed network, such as within a private network of an enterprise, on an open or public network, such as the Internet, or on a combination of these networks, such as when a party to the call or conference call is on a private, enterprise network and another party in on the Internet or a different private network. Typically, voice or video calls or conference calls on either an open, public network or on a private network can be established and conducted using known protocols such as User Datagram Protocol (UDP) or Web Real Time Communication (WebRTC) protocol without concern about crossing boundaries between the private network and the open network. However, when a call or conference calls is to be established and conducted across both open and private networks or across different private networks, security policies may be in place on the private network(s) that prohibit certain types of traffic from crossing the boundary between these networks.

For example, a Session Initiation Protocol (SIP) or HyperText Transport Protocol (HTTP) client may try to initiate a call or conference call with another party on an enterprise network different from the private or public network of the client. Such a call or conference call will traverse one or more firewalls of the enterprise. However, the enterprise may implement security policies that prohibit UDP, WebRTC, or other media protocol packets from crossing this firewall causing the call or conference call to fail.

Session Border Controller (SBC)s are border elements which can help securely connect a customer SIP network to external SIP networks. SBCs deal with both media and signaling and can perform protocol adaptation, address translation, enforce complex polices, media transcoding, topology hiding, etc. When enabling a call between a private enterprise network and a service provider or endpoint on the public Internet, an SBC changes Internet Protocol (IP) addresses in the Contact, Request-URI, Route, Record-Route and Via headers whenever a SIP message crosses the network boundary. This enables most call flows but is not sufficient when multiple calls from the private enterprise network are being made to multiple endpoints over the SBC.

SUMMARY

According to an embodiment of the present disclosure, a given branch session manager (SM) connected on the b-side of a Session Border Controller (SBC) through a firewall, initially sends a request to a Core SM connect on the a-side of the SBC. When sending the initial request from the Branch SM to the Core SM, the Branch SM provides the Server Name Indication (SNI) of the Core SM to which it wishes to connect to the SBC. When the core SM wants to communicate with the branch SM by passing the core SM's Session Initiation Protocol (SIP)-Fully Qualified Domain Name (FQDN) to the SBC in the SIP route header request from the Core SM, the SBC matches the SIP-FQDN with the SNI that was used by the given branch SM during the initial request. The request from the Core SM is forwarded on the socket to the given Branch SM's ephemeral port since the connection from the b-side of the SBC to the given branch SM is a Request for Comment (RFC) 5923 "Connection Reuse in SIP" connection. The connection from the a-side of the SBC to the Core SM is an RFC 3261 connection.

These and other needs are addressed by the various embodiments and configurations of the present invention. The present invention can provide a number of advantages depending on the particular configuration. These and other advantages will be apparent from the disclosure of the invention(s) contained herein.

In some aspects, the techniques described herein relate to a method including receiving, by a processor of a border element, a Session Initiation Protocol (SIP) connection request from a first communication device of a first network to establish a connection between the first communication device and a second communication device of a second network, establishing, by the processor, a connection between the first communication device and the border element via a channel, retrieving, by the processor, an identifier provided in a route header of the SIP connection request identifying the second communication device of the second network, mapping, by the processor, the identifier with the channel providing the connection between the first communication device and the border element, receiving, by the processor, a SIP request from the second communication device to the first communication device, and establishing, by the processor, a communication between the second communication device and the first communication device using the identifier mapped with the channel providing the connection between the first communication device and the border element. The method further includes that the SIP request includes the identifier.

In some aspects, the techniques described herein relate to a method further including establishing, by the processor, a connection between the second communication device and the border element.

In some aspects, the techniques described herein relate to a method, wherein the connection between the second communication device and the border element is established using Request for Comment (RFC) 3261.

In some aspects, the techniques described herein relate to a method, wherein the connection between the first communication device and the border element is established using Request for Comment (RFC) 5293.

In some aspects, the techniques described herein relate to a method, wherein the network border is a Session Border Controller (SBC).

In some aspects, the techniques described herein relate to a method, wherein the identifier includes a Server Name Indication (SNI).

In some aspects, the techniques described herein relate to a method, wherein the first network is a private network and the second network is a public network such as the Internet.

In some aspects, the techniques described herein relate to a method, wherein a firewall is provided between the second communication device and the border element and wherein the firewall operates as a Network Address Translation (NAT) device that modifies the Internet Protocol (IP) address of the first communication device In some aspects, the techniques described herein relate to a computer system, including a processor and a computer-readable storage medium storing computer-readable instructions, which when executed by the processor, cause the processor to execute a border element that receives a Session Initiation Protocol (SIP) connection request from a first communication device of a first network to establish a connection between the first communication device and a second communication device of a second network, establishes a connection between the first communication device and the border element via a channel, retrieves an identifier provided in a route header of the SIP connection request identifying the second communication device of the second network, maps the identifier with the channel providing the connection between the first communication device and the border element, receives a SIP request from the second communication device to the first communication device, wherein the SIP request includes the identifier and establishes a communication between the second communication device and the first communication device using the identifier mapped with the channel providing the connection between the first communication device and the border element.

In some aspects, the techniques described herein relate to a computer system, wherein the computer-readable instructions, when executed by the processor, further cause the processor to execute the border element that establishes a connection between the second communication device and the border element.

In some aspects, the techniques described herein relate to a computer system, wherein the connection between the second communication device and the border element is established using Request for Comment (RFC) 3261.

In some aspects, the techniques described herein relate to a computer system, wherein the connection between the first communication device and the border element is established using Request for Comment (RFC) 5293.

In some aspects, the techniques described herein relate to a computer system, wherein the network border is a Session Border Controller (SBC).

In some aspects, the techniques described herein relate to a computer system, wherein the identifier includes a Server Name Indication (SNI).

In some aspects, the techniques described herein relate to a computer system, wherein the first network is a private network and the second network is a public network such as the Internet.

In some aspects, the techniques described herein relate to a computer system, wherein a firewall is provided between the second communication device and the border element and wherein the firewall operates as a Network Address Translation (NAT) device that modifies the Internet Protocol (IP) address of the first communication device.

In some aspects, the techniques described herein relate to a computer program product including a computer-readable storage medium having computer-readable program code embodied therewith, the computer-readable program code configured, when executed by a processor, to receive a Session Initiation Protocol (SIP) connection request from a first communication device of a first network to establish a connection between the first communication device and a second communication device of a second network, establish a connection between the first communication device and a border element via a channel, retrieve an identifier provided in a route header of the SIP connection request identifying the second communication device of the second network, map the identifier with the channel providing the connection between the first communication device and the border element, receive a SIP request from the second communication device to the first communication device, wherein the SIP request includes the identifier and establish a communication between the second communication device and the first communication device using the identifier mapped with the channel providing the connection between the first communication device and the border element.

In some aspects, the techniques described herein relate to a computer program product, wherein the computer-readable instructions, when executed by the processor, further cause the processor to execute the border element that establishes a connection between the second communication device and the border element.

In some aspects, the techniques described herein relate to a computer program product, wherein the connection between the second communication device and the border element is established using Request for Comment (RFC) 3261.

In some aspects, the techniques described herein relate to a computer program product, wherein the connection between the first communication device and the border element is established using Request for Comment (RFC) 5293.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases “at least one,” “one or more,” “or,” and “and/or” are open-ended expressions that are both conjunctive and disjunctive in operation. For example, each of the expressions “at least one of A, B, and C,” “at least one of A, B, or C,” “one or more of A, B, and C,” “one or more of A, B, or C,” “A, B, and/or C,” and “A, B, or C” means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, radio frequency (RF), etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

Whenever possible, the same reference numbers will be used throughout the drawing(s) and accompanying written description to refer to the same of like parts.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
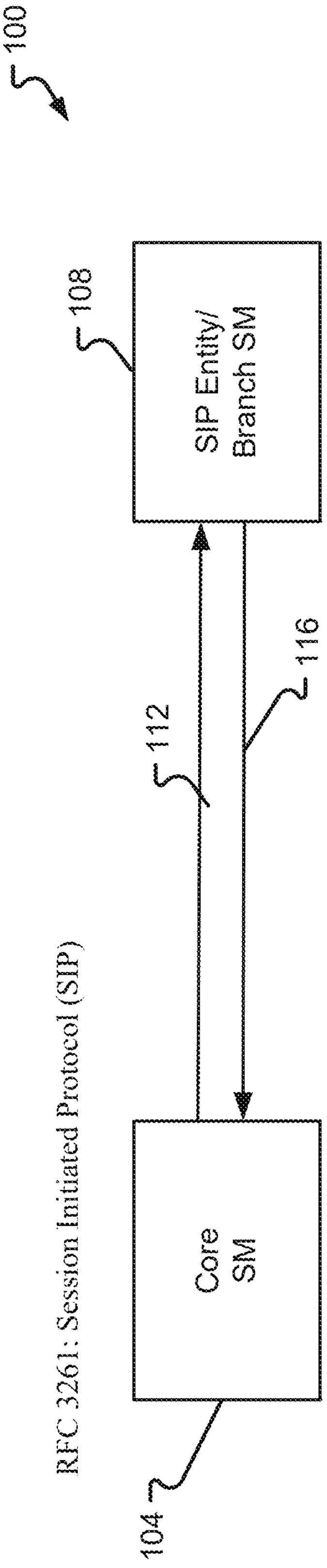
FIG. 1 is a block diagram of an illustrative communication system.

As discussed in the background, exchanges of messages may occur in various types of communication sessions, different types of communication devices and across different types of communication networks. As one example, the Request for Comment (RFC) 3261: Session Initiation Protocol (SIP) protocol, provides that when two SIP agents are communicating with SIP, each SIP agent establishes a connection to the other SIP. FIG. 1 is a block diagram of an illustrative communication system 100 employing SIP RFC 3261. Communication system 100 may include Core Session Manager (SM) 104 in communication with a SIP entity/branch SM 108. The communication system 100 provides for bi-directional communication (e.g., requests and responses) over a first channel 112 established by the Core SM 104 and bi-directional communication over a second channel 116 established by the SIP entity/branch SM 108. Therefore, when Core SM 104 establishes a connection with SIP entity/branch SM 108, requests from Core SM 104 to SIP entity/branch SM 108 and responses from SIP entity/branch SM 108 to Core SM 104 are sent over channel 112. Likewise, when SIP entity/branch SM 108 establishes a connection with Core SM 104, requests from SIP entity/branch SM 108 to Core SM 104 and responses Core SM 104 to SIP entity/branch SM 108 are sent over channel 116.

The 5061 ports for each of the Core SM 104 and the SIP entity/branch SM 108 are used for SIP over the Transport Layer Security (TLS). The 5061 port is typically used for secure SIP communications. When SIP is transported over the TLS, it helps ensure privacy and integrity of the communication by encrypting the data. The ephemeral ports for each of the Core SM 104 and the SIP entity/branch SM 108 are typically dynamically assigned by the operating system for outgoing connections and are used as temporary ports for a session. SIP clients may use ephemeral ports for sending requests or establishing sessions with SIP servers, but the server side will often use well-known ports like the 5060 port (for SIP over UDP or TCP) and the 5061 port (for SIP over TLS). Communication system 100 operates using the Request for Comment (RFC) 3261: SIP protocol.

Figure 2:
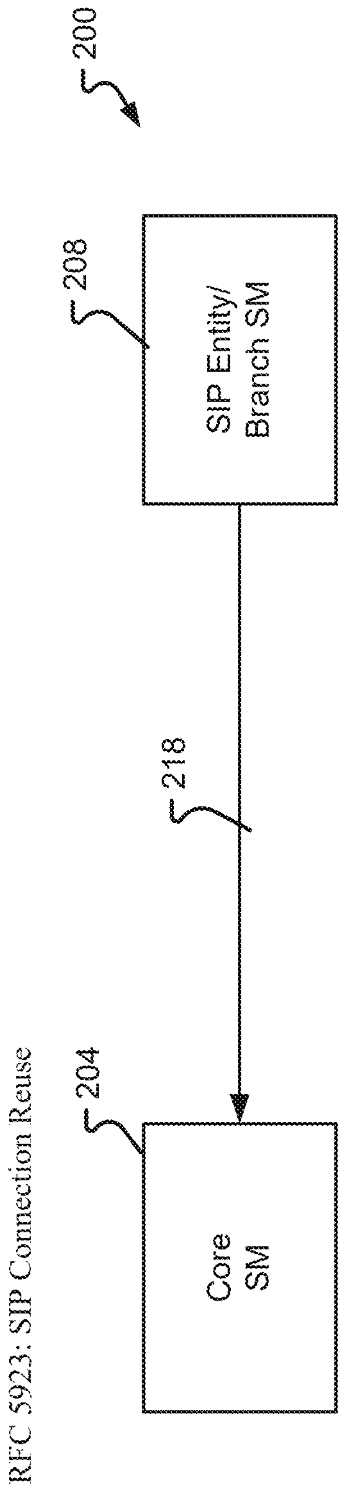
FIG. 2 is a block diagram of another illustrative communication system.

FIG. 2 is a block diagram of another illustrative communication system 200 employing SIP RFC 5923. Communication system 200 may include Core SM 204 in communication with SIP entity/Branch SM 208. Communication system 200 provides for bi-directional communication over a single channel 218 established by the SIP entity/Branch SM 208. Communication system 200 operates using the RFC 5923: SIP Connection Reuse protocol. The RFC 3261 protocol is the core specification for SIP, providing the complete framework for initiating, managing, and terminating communication sessions. RFC 5923 is an extension to improve SIP's session reliability by introducing a session timer mechanism that periodically refreshes sessions to prevent them from becoming stale. According to an embodiment of the present disclosure, a client certificate and TLS mutual authentication are required in order to utilize the connection in both directions.

Figure 3:
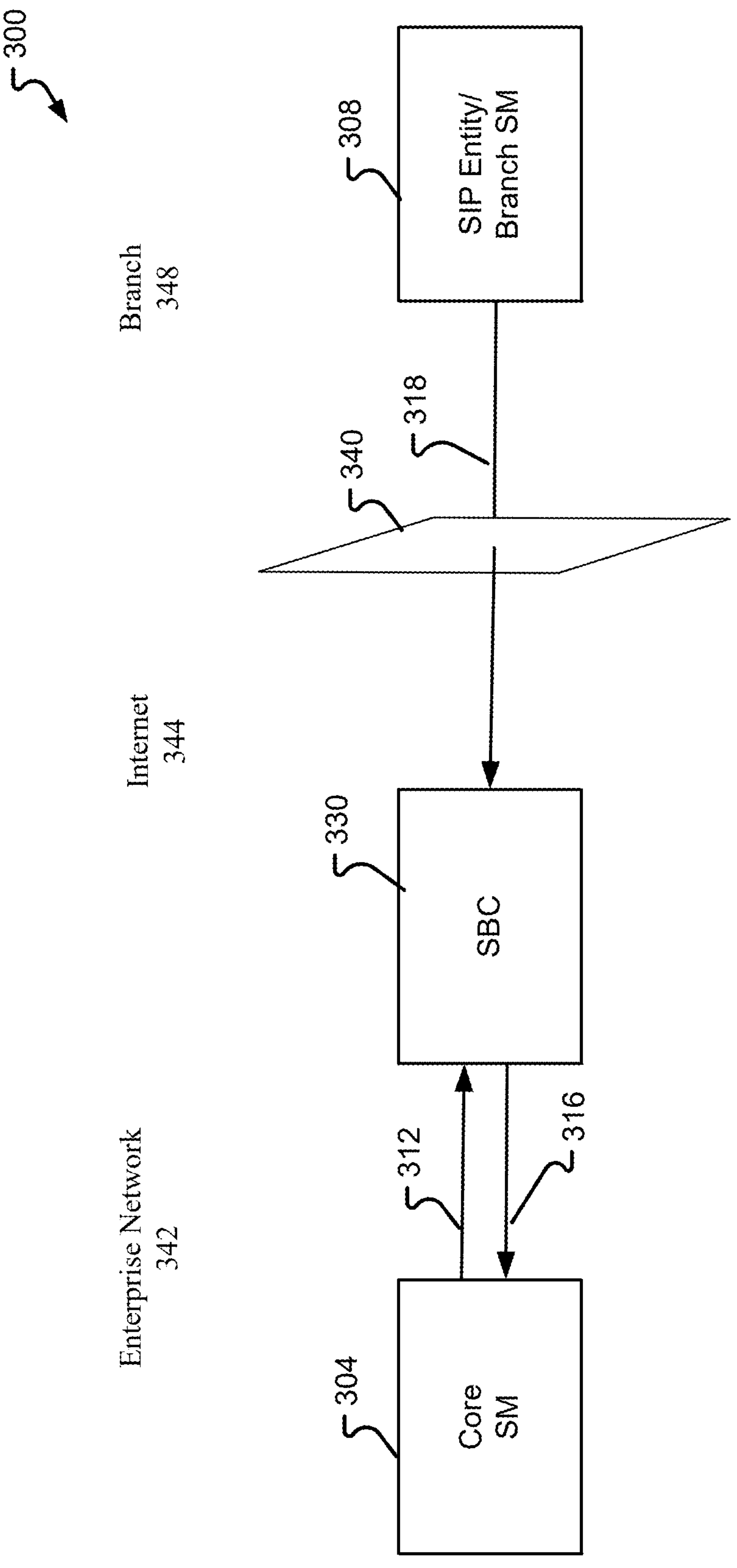
FIG. 3 is a block diagram of an illustrative communication system between components that are in different environments in accordance with embodiments of the present disclosure.

FIG. 3 is a block diagram of an illustrative communication system 300 between components that are in different environments in accordance with embodiments of the present disclosure. The communication system 300 includes a Core SM 304, a SIP entity/branch SM 308, a Session Border Controller (SBC) 330 and a firewall 340. The Core SM 304 is provided within an enterprise network 342 (e.g., a first environment) and the SIP entity/branch SM 308 is provided within Branch 348 (e.g., a second environment). The Core SM 340 and the SBC 330 establish a communication connection employing SIP RFC 3261 which provides for bi-directional communication (e.g., requests and responses) over a first channel 312 established by the Core SM 304 and bi-directional communication over a second channel 316 established by SBC 330. Therefore, when Core SM 304 establishes a connection with SBC 330, requests from Core SM 304 to SBC 330 and responses from SBC 330 to Core SM 304 are sent over channel 312. Likewise, when SBC 330 establishes a connection with Core SM 304, requests from SBC 330 to Core SM 304 and responses Core SM 304 to SBC 330 are sent over channel 316.

The SIP entity/branch SM 308 and the SBC 330 establish a communication connection employing SIP RFC 5923. This involves the SIP entity/Branch SM 308 establishing a communication connection with SBC 330 (e.g., a bi-directional communication connection) over channel 318. The SBC 330 and the firewall 340 connect to the Internet 344. According to an embodiment of the present disclosure, one side (e.g., an interface) of the SBC 330 connects to the enterprise network 342 and another side of the SBC 330 connects to the Internet 344. The firewall 340 is part of the branch 348. As stated above, the Core SM 304 communicates with the SBC 330 over channels 312 and 316 using the RFC 3261 protocol and the SBC 330 communicates with the SIP entity/branch SM 308 via the firewall 340 over channel 318 using the RFC 5923 protocol.

Figure 4:
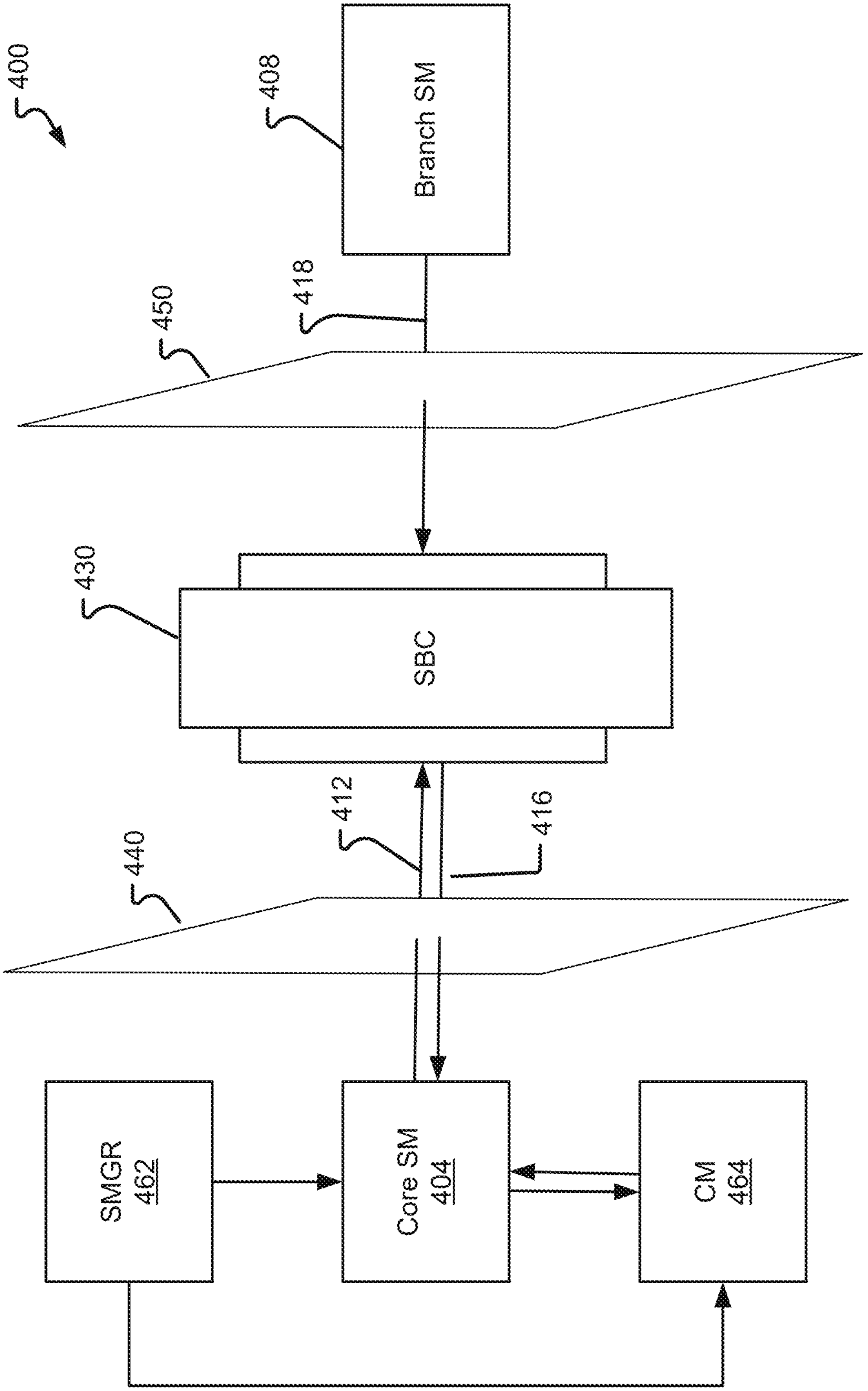
FIG. 4 is a block diagram of an illustrative communication system between components that are in different environments in accordance with embodiments of the present disclosure.

FIG. 4 is a block diagram of an illustrative communication system 400 between components that are in different environments in accordance with embodiments of the present disclosure. The communication system 400 includes a Core SM 404, a branch SM 408, an SBC 430, firewalls 440 and 450, a system manager (SMGR) 462 and a communication manager (CM) 464. The Core SM 404, SMGR 463 and CM 464 are provided within an enterprise network (e.g., a first environment) and the Branch SM 408 is provided within a branch network (e.g., a second environment). The Core SM 440 and the SBC 430 establish a communication connection employing SIP RFC 3261 which provides for bi-directional communication (e.g., requests and responses) over a first channel 412 established by the Core SM 404 and bi-directional communication over a second channel 416 established by SBC 430. The Branch SM 408 and the SBC 430 establish a communication connection employing SIP RFC 5923. This involves Branch SM 408 establishing a communication connection with SBC 430 (e.g., a bi-directional communication connection) over channel 418.

CM 464 is the SIP processing engine (e.g., the PBX) that handles real-time communication and call control for SIP and non-SIP devices. The SMGR 462 provides administration and configuration for the CM 464, the branch SM 408 and the Core SM 404. Moreover, the SMGR 462 provides the management interface, allowing administrators to configure the SIP settings, user profiles, and routing rules that the CM 464 and other applications use. Both the CM 464 and the SMGR 462 are often deployed in environments where the Core SM 404 is used to handle SIP routing and normalization between different systems.

According to an embodiment of the present disclosure, firewall 440 is provided as an enterprise firewall in the first environment and firewall 450 is provided as a branch firewall in the second environment. The firewalls 440 and 450 operate as network address translation (NAT) devices. A NAT device is a networking mechanism used to modify the IP address information in IP packet headers while in transit across a router or firewall 440 and 450. NAT allows multiple devices on a private network to share a single public IP address, facilitating communication with external networks, such as the Internet. According to an embodiment of the present disclose, when the Branch SM 408 wants to establish a connection with the Core SM 404, the Branch SM 408 first establishes a connection with the SBC 430. The connection is established employing SIP RFC 5923. The SBC 430, however, does not know the IP address of the Branch SM 408 since the IP address from the Branch SM 408 is translated by the firewall 450 (e.g., the source address of the incoming connection is translated by the firewall 450).

According to embodiments of the present disclosure, SIP uses TLS to encrypt signaling traffic between User Agents (UAs), proxies, and other intermediaries such as the SBC 430. TLS ensures that the communication between two SIP entities is confidential, integrity-protected, and authenticated. When a SIP connection (e.g., a call setup) is initiated over TLS, the negotiation follows standard TLS handshake procedures. The typical steps include:

ClientHello: The client (such as a SIP User Agent) sends a ClientHello message to the server (such as a SIP proxy or SBC) to initiate the handshake. This message contains the supported cryptographic algorithms and TLS versions. ServerHello: The server responds with a ServerHello, selecting the cryptographic parameters (cipher suites) for the session. Server Certificate: The server provides its certificate to authenticate itself to the client. Key Exchange: Both parties agree on a shared secret using the selected key exchange mechanism. Finished: After exchanging the necessary keys and finalizing the handshake, encrypted data can begin flowing between the client and server. This negotiation ensures that the SIP messages exchanged between components are encrypted and secure.

According to embodiment of the present disclosure, during TLS negotiations, a server name indication (SNI) is provided in the route header of a SIP message from the Branch SM 408 to the SBC 430 identifying which Core SM 404 the Branch SM 408 wants to communicate with (e.g. establishing a separate connection for each Core SM 404 that the Branch SM 408 wants to communicate with). The route header in SIP is used to manage the routing of SIP requests and responses. It is used to define the intermediary routing path that a SIP message should take through various proxies, SBCs, or other devices. This route header ensures that SIP messages are properly forwarded through the network. When a SIP request (e.g., an INVITE or REGISTER) is sent, the SIP request can include a route header that lists a series of proxies or SBCs that the message should pass through. Each proxy or SBC removes itself from a route list before forwarding the SIP request to the next device. For example, an example route header from the Core SM 404 or the Branch SM 408 in FIG. 4 is Route: <sip:SBC.example-.com; lr>, which tells the SIP message pass through SBC.example.com.

The SNI is an extension to the Secure Sockets Layer (SSL)/TLS protocol used to indicate which hostname a client is attempting to connect to at the start of the handshake process. This is important in environments where multiple SSL/TLS certificates are hosted on the same IP address (virtual hosting). The SNI allows the SBC or a SIP server to present the correct SSL certificate based on the domain name the client is attempting to connect to. The SBC checks the SNI value in the TLS handshake to match it with the appropriate certificate. In a TLS handshake in relation to FIG. 4, the client (e.g., Brand SM 408) might send the SNI value: SNI: "SM.example.com" to identify Core SM 404. SBC 430 uses the certificate for SM.example.com to establish a secure connection. According to embodiments of the present disclosure, the SBC 430 stores each SNI with its associated connection.

A fully qualified domain name (FQDN) is the complete domain name for a specific server or service on the Internet. The FQDN includes both the hostname and the domain name, ensuring the FQDN is globally unique. In SIP communications, the FQDN is used to identify and address servers, SBCs, or proxies involved in SIP signaling. SIP entities (like SBCs or SIP servers) are often identified using their FQDN, which allows the SIP entities to be accessed reliably across The internet. The FQDN is used in SIP URIs to route messages or identify destinations. Example: A SIP request might target an FQDN like: "sip: username@sip.example.com". This indicates that the SIP message should be routed to the server with the FQDN sip.example.com.

Therefore, when a SIP message is transmitted between different networks (for example, from a client to a SIP proxy via an SBC), the FQDN is typically used in the SIP headers (such as To, From, or Request-URI) to identify the destination and the origin. The Route header may be used to guide the message through various SBCs or proxies along the way, ensuring that the SIP messages reach the correct destination. If the communication is secured via TLS, the SNI helps ensure the correct SSL/TLS certificate is used based on the domain name, preventing certificate mismatches and enabling secure communication. Since firewall 540 is provided between SBC 430 and Branch SM 408, it is impossible for the SBC 430 to determine which link to send a SIP message from the Core SM 404 to a Branch SM when there are multiple Branch SMs and/or multiple links for the same Branch SM.

Figure 5:
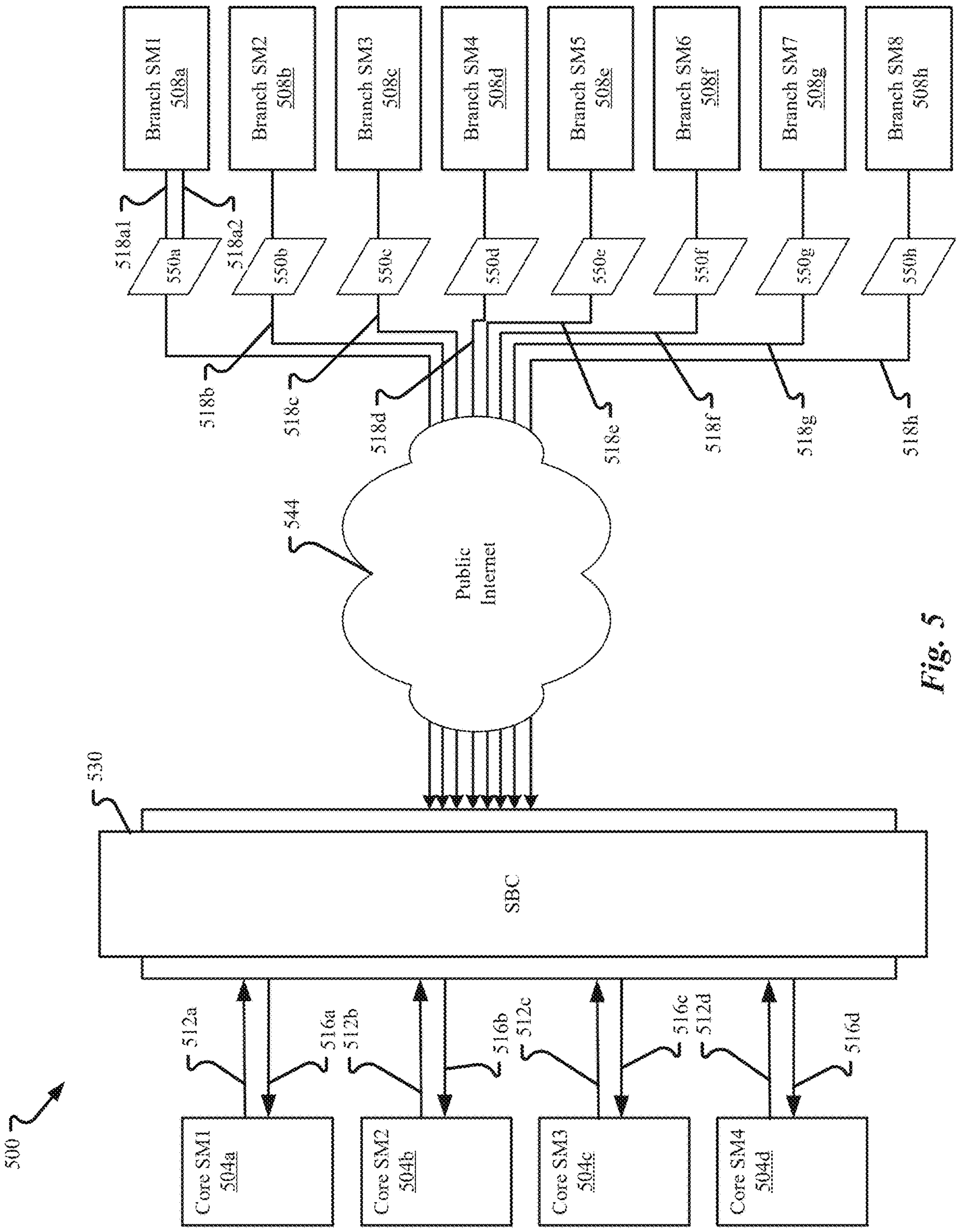
FIG. 5 is a block diagram of an illustrative communication system between components that are in different environments in accordance with embodiments of the present disclosure.

FIG. 5 is a block diagram of an illustrative communication system 500 between components that are in different environments in accordance with embodiments of the present disclosure. As illustrated in FIG. 5, multiple Core SMs (e.g., Core SM1 504*a*, Core SM2 504*b*, Core SM3 504*c* and Core SM4 504*d*) communicate with multiple Branch SMs (e.g., Branch SM1 508*a*, Branch SM2 508*b*, Branch SM3 508*c*, Branch SM4 508*d*, Branch SM5 508*e*, Branch SM6 508*f*, Branch SM7 508*g*, and Branch SM8 508*h*) connected between SBC 530, public Internet 544 and firewalls (e.g., 550*a*, 550*b*, 550*c*, 550*d*, 550*fe*, 550*f*, 550*g* and 550*h*). As illustrated in FIG. 5 for example, each Branch SM2 508*b*-Branch SM8 508*h* has one link 518*b*-518*h*, respectively, connected to the SBC 530 via firewalls 550*b*-550*h*. Also as illustrated in FIG. 5, Branch SM1 508*a* includes one than one link (e.g., 518*a*1-518*a*2) connected to the SBC 530 via firewall 550*a*.

According to an embodiment of the present disclosure, the Core SMs 504*a*-504*d* may be provided within an enterprise network (e.g., a first environment) and the SIP entity Branch SMs 508*a*-508*h* may be provided within a branch network (e.g., a second environment). The Core SMs 504*a*-504*d* and the SBC 530 establish communication connections employing SIP RFC 3261 which provide for bi-directional communications (e.g., requests and responses) over first channels 512*a*-512*d* established by the Core SMs 504*a*-504*d* and bi-directional communication over second channels 516*a*-516*d* established by SBC 530.

The Branch SMs 508*a*-508*h* and the SBC 530 establish communication connections employing SIP RFC 5923. This involves Branch SMs 508*a*-508*h* establishing communication connections with SBC 530 (e.g., bi-directional communication connections) via firewalls 550*a*-550*h* over channels 518*a*1-518*h*. Communication connections may be established by a SIP options message or SIP options request, for example. According to embodiments of the present disclosure, the action that forces the communication connection to be established between a Branch SM 508*a*-508*h* and SBC 530 is typically going to be the first thing that will get sent as an option so that a Branch SM 508*a*-508*h* can monitor the connection (e.g., 518*a*1-518*h*). According to an embodiment of the present disclosure, the action that forces the communication connection to be established between a Branch SM 508*a*-508*h* and SBC 530 may include a request that is made by a Branch SM 508*a*-508*h* to communicate with a particular Core SM 504*a*-504*d*.

In other words, the action that forces the communication connection to be established between a Branch SM 508*a*-508*h* and SBC 530, includes a SIP options message or a SIP options request from a Branch SM 508*a*-508*h* to SBC 530 identifying a particular Core SM 504*a*-504*d*. The particular Core SM 504*a*-504*d* is identified by the SNI that is provided in the route header of a SIP message from a Branch SM 508*a*-508*h* to the SBC 530 identifying which Core SM 504*a*-504*d* the Branch SM 508*a*-508*h* wants to communicate with (e.g. establishing a separate connection for each Core SM 504*a*-504*d* that the Branch SM 508*a*-508*h* wants to communicate with).

According to an embodiment of the present disclosure as illustrated in FIG. 5, Branch SM2 508*b* may want to establish a SIP connection (e.g., a call setup) initiated over TLS with SBC 530 via firewall 550*b* wanting to communicate with Core SM3 504*c*. According to the example embodiment, the SNI that identifies Core SM3 504*c* may be for example, "SM3.example.com".

After the communication connection has been established between Branch SM2 508*b* and SBC 530 which identifies Core SM3 504*c*, Core SM3 504*c* may want to initiate communication with Branch SM2 508*b*. When a SIP message is transmitted between different networks (for example, from a client to a SIP proxy via an SBC—the first environment and the second environment), a FQDN is typically used in the SIP headers (such as To, From, or Request-URI) to identify the destination and the origin. When communicating with Branch SM2 508*b*, Core SM3 504*c* includes in the route header, its SNI value "SM3.example.com". The SBC 530 uses the SNI provided in the route header to determine which Branch SM 508*a*-508*h* and which link (518*a*1 to 518*h*) to send the SIP message since the Branch SM1-Branch SM8 is not identified in the IP message from the Branch SM1-Branch SM8 to the SBC 530. Therefore, the SBC uses the previously established communication parameters between Branch SM2 508*b* and SBC 530 which identifies Core SM3 504*c* and the SNI value of "SM3.example.com" to properly route the SIP message to the correct Branch SM and the correct link for a particular Branch SM. In other words, when the core SM wants to communicate with the branch SM by passing the core SM's SIP-FQDN to the SBC in the SIP route header request from the Core SM, the SBC matches the SIP-FQDN with the SNI that was used by the given branch SM during the initial request.

Figure 6:
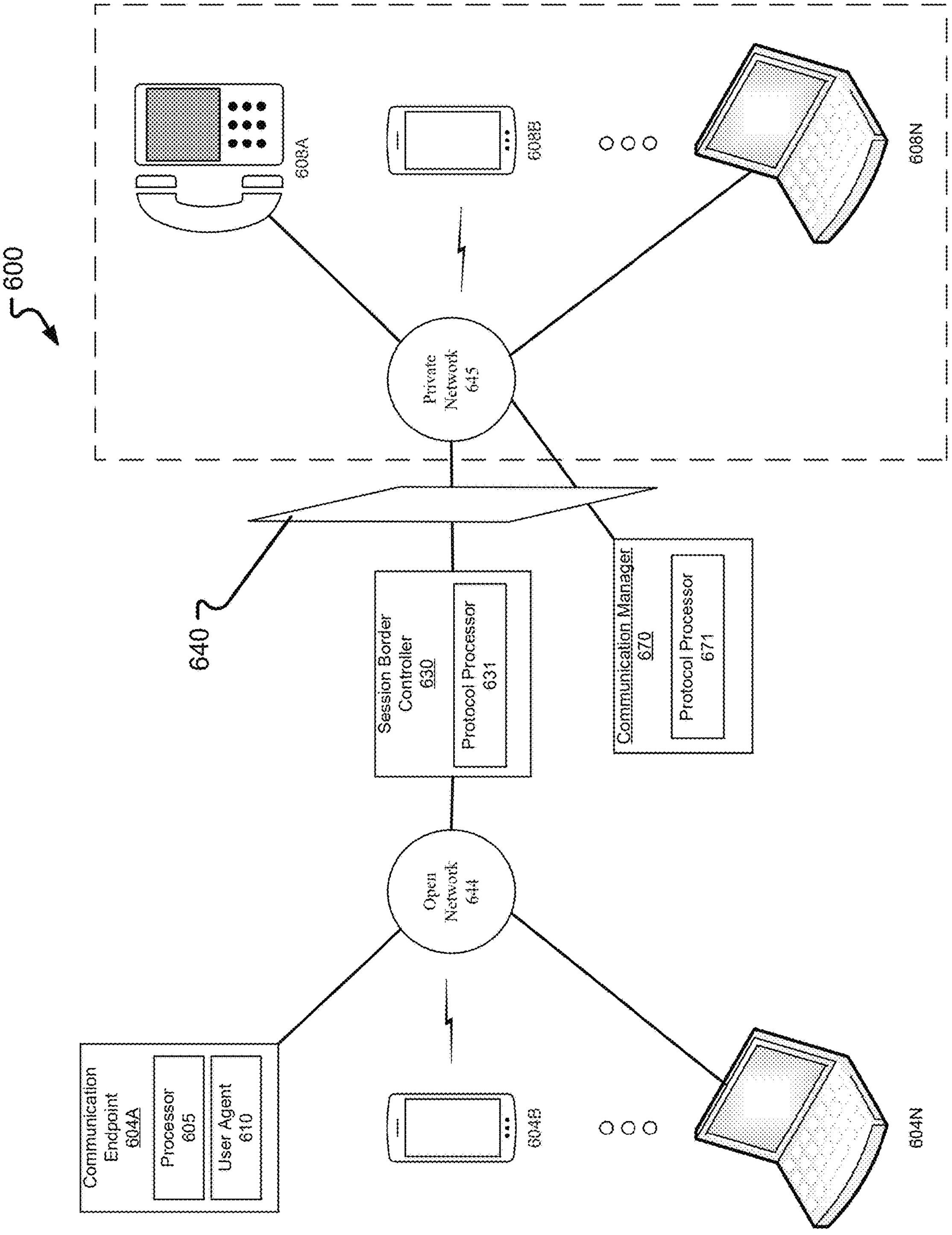
FIG. 6 is a block diagram of an illustrative communication system between components that are in different environments in accordance with embodiments of the present disclosure.

FIG. 6 is a block diagram of an illustrative communication system 600 for providing a communication session between components that are in different environments in accordance with embodiments of the present disclosure. The illustrative communication system 600 includes communication devices 604A-604N and 608A-608N, communication networks in the form of an open network 644 and a private network 645, an SBC 630, and a communication manager 670. According to one embodiment of the present disclosure, the communication devices 608A-608N may be agent terminals for example. The illustrative communication system 600 is for of an exemplary call center environment. However, the illustrative communication system may be implemented in a non-call center environment where the communication devices 608A-608N are for users.

The communication devices 604A-604N and 608A-608N can be or may include any device that can communicate on the communication network 110A, such as a Personal Computer (PC), a telephone, a video system, a cellular telephone, a Personal Digital Assistant (PDA), a tablet device, a notebook device, a smart phone, a media server, and/or the like. As shown in FIG. 1, any number of communication devices 604A-604N may be connected to the open network 644, including only a single communication device 604.

The communication device 604A further includes a processor 605 and a user agent 610. The UA 610 can be or may include any hardware/software that can handle SIP messages for the communication device 604A. Although the communication devices 604B-604N are not shown including the processor 605 and the user agent 610, each of the communication devices 604B-604N can also include a respective processor 605 and user agent 610. In some embodiments of the present disclosure, the user agent 610 may process messages for other types of communication sessions, such as video protocols, H.323. Web Real-Time Communication (WebRTC) protocol and/or the like.

The open network 644 and the private network 645 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The open network 644 and the private network 645 can use a variety of electronic protocols, such as Ethernet, Internet Protocol (IP), Session Initiation Protocol (SIP), Integrated Services Digital Network (ISDN), Real-Time Protocol (RTP), and/or the like. Thus, the open network 644 and the private network 645 are electronic communication networks configured to carry messages via packets and/or circuit switched communications. In a typical environment, the open network 644 is a public network, such as the Internet and the private network 645 is a corporate or enterprise network.

The SBC 630 can be or may include any hardware/software that can provide security services for the private network 645, such as a firewall 640, a gateway, a Network Address Translator (NAT), and/or the like. The SBC 630 has the ability to fork any number media streams for call recording. The SBC further includes a protocol processor 631.

The communication manager 670 can be any hardware coupled with software that can manage communications, such as a Private Branch Exchange (PBX), a proxy server, a router, a call processor, a network switch, a central office switch, and/or the like. The communication manager 670 further includes a communication processor. The communication processor can be any processor that can process communications, such as, a microprocessor, a Digital Signaling Processor (DSP), a microcontroller, and/or the like. The communication processor is typically coupled with firmware and/or software to process communications.

Figure 7:
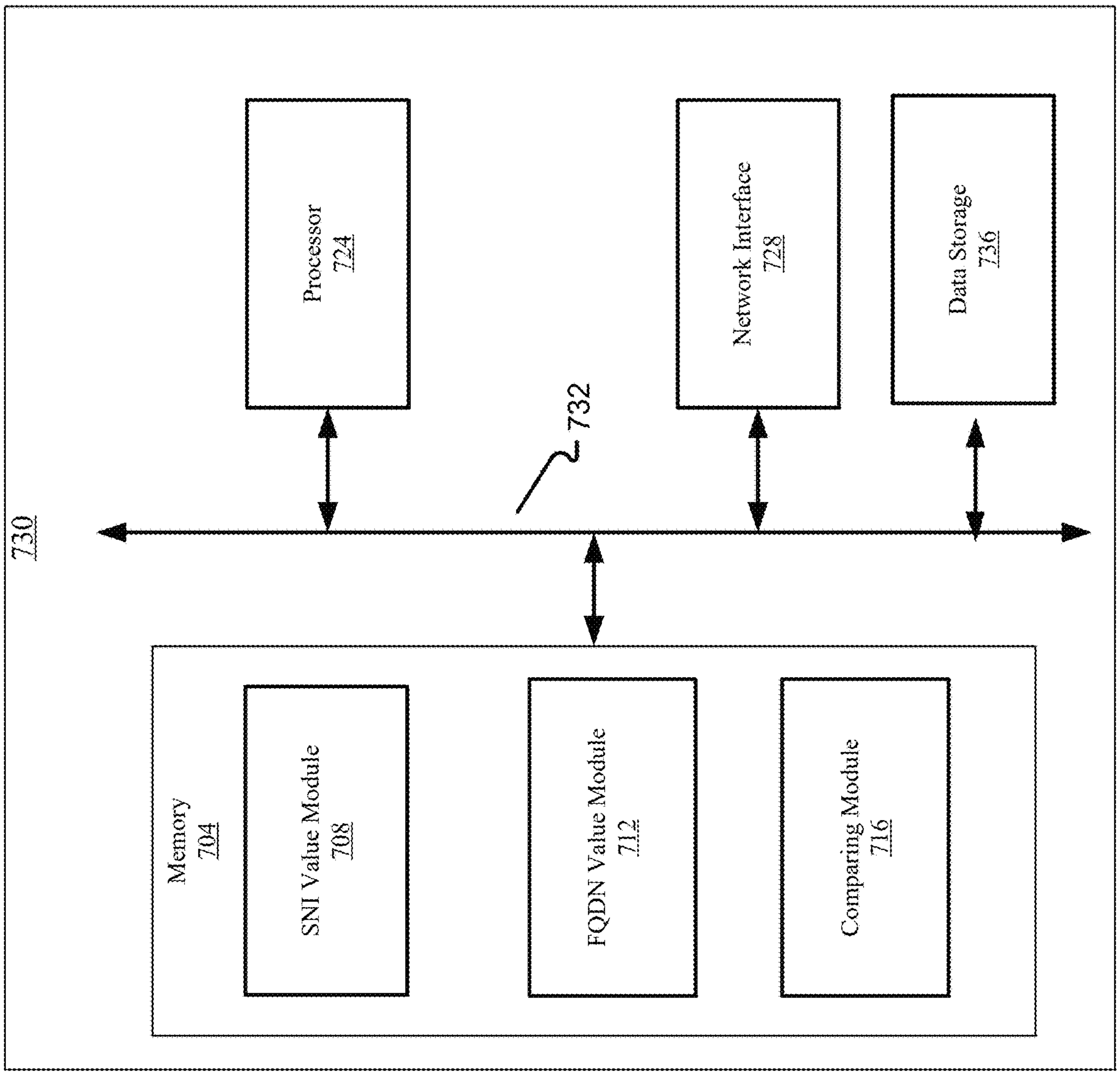
FIG. 7 is a block diagram of an illustrative session border controller (SBC) in accordance with at least some of the embodiments of the present disclosure.

FIG. 7 is a block diagram of an illustrative session border controller (SBC) or SIP server 730 in accordance with at least some of the embodiments of the present disclosure. In one embodiment, the communication manager 670 may be embodied, in whole or in part, as device 730 comprising various components and connections to other components and/or systems. The components are variously embodied and may include memory 704, a processor 724, a network interface 728 and data storage 736. Processor 724 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 732, executes instructions, and outputs data, again such as via bus 732.

Data storage 736 is provided for the storage of accessible data, such as instructions, values, etc. Network interface 728 facilitates communication with components, such as processor 724 via bus 732 with components not accessible via bus 732. Memory 704 includes SNI Value Module 708, FQDN Value Module 712 and Comparing Module 716. SNI Value Module 708 stores the SNI value provided in the SIP message header from a Branch SM identifying a particular Core SM that the Branch SM wants to communicate with. The FQDN Value Module 712 stores the SNI value provided in the SIP message from the Core SM. According to an embodiment of the present disclosure, the SNI value identifies the Core SM itself. Comparing Module 716 compares the SNI provided in the FQDN with the stored SNI to determine which Branch SM to route the SIP message from the Core SM.

Since the Branch SM is not identified by the SBC at an initial connection between the Branch SM and the SBC because of the translation of the Branch SM's IP address by the firewall, the SBC cannot identify which Branch SM to route the SIP message from a Core SM. According to an embodiment of the present disclosure the Comparing Module 716 matches or compares the SNI provided in the FQDN with the stored SNI to determine which Branch SM to route the SIP message from the Core SM. Ones of ordinary skill in the art will appreciate that other communication equipment may be utilized, in addition or as an alternative, to those described herein without departing from the scope of the embodiments.

Figure 8:
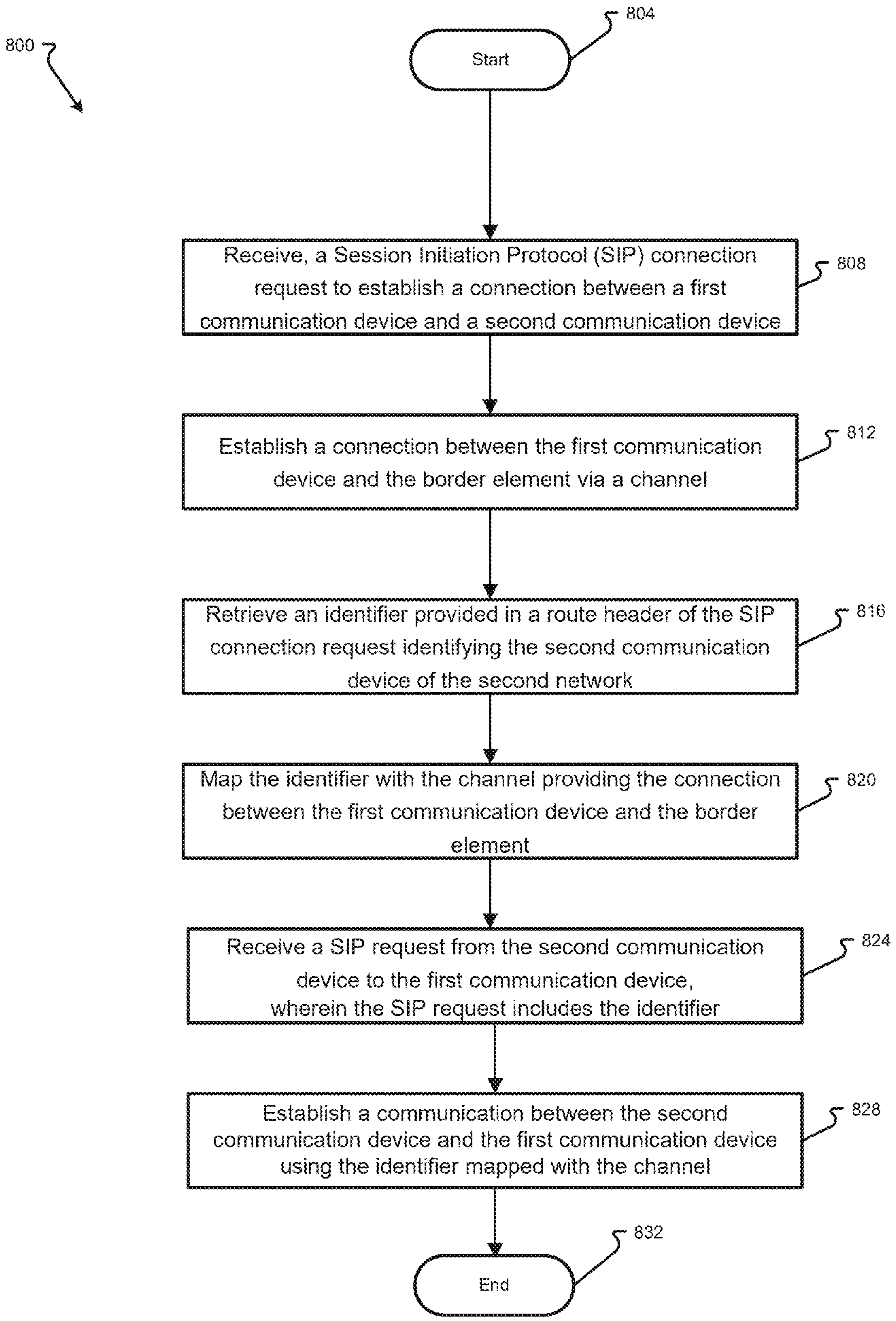
FIG. 8 depicts a flow diagram depicting a method for providing a communication session between components that are in different environments in accordance with embodiments of the present disclosure.

FIG. 8 depicts a flow diagram depicting a method 800 for providing a communication session between components that are in different environments in accordance with embodiments of the present disclosure. While a general order of the steps of method 500 is shown in FIG. 8, method 800 can include more or fewer steps or can arrange the order of the step differently than those shown in FIG. 8. Further, two or more steps may be combined in one step. Generally, method 800 starts at a START operation at step 804 and ends with an END operation at step 832. Method 800 can be executed as a set of computer-executable instructions executed by a computer system (e.g., the processor 702, etc.) and encoded or stored on a computer readable medium (e.g., memory 706, etc.). Hereinafter, method 800 shall be explained with reference to the systems, components, modules, applications, software, data structures, user interfaces, etc. described in conjunction with FIGS. 1-7.

As illustrated in FIG. 8, method 800 begins at the START operation at step 804 and proceeds to step 808, where the processor 702 or the processor 631 of the SBC 630 receives a Session Initiation Protocol (SIP) connection request from a first communication device of a first network to establish a connection between the first communication device and a second communication device of a second network. After receiving a SIP connection request from a first communication device of a first network to establish a connection between the first communication device and a second communication device of a second network at step 808, method 800 proceeds to step 812, where the processor 702 or the processor 631 of the SBC 630, establishes a connection between the first communication device and the border element via a channel. After establishing a connection between the first communication device and the border element via a channel at step 812, method 800 proceeds to step 816, where the processor 702 or the processor 631 of the SBC 630, retrieves an identifier provided in a route header of the SIP connection request identifying the second communication device of the second network. After retrieving an identifier provided in a route header of the SIP connection request identifying the second communication device of the second network at step 816, method 800 proceeds to step 820 where the processor 702 or the processor 631 of the SBC 630 maps the identifier with the channel providing the connection between the first communication device and the border element.

After mapping the identifier with the channel providing the connection between the first communication device and the border element at step 820 method 800 proceeds to step 824 where the processor 702 or the processor 631 of the SBC 630 receives a SIP request from the second communication device to the first communication device, wherein the SIP request includes the identifier. After receiving a SIP request from the second communication device to the first communication device at step 824, method 800 proceeds to step 828, where the processor 702 or the processor 631 of the SBC 630 establishes a communication between the second communication device and the first communication device using the identifier mapped with the channel providing the connection between the first communication device and the border element. After establishing a communication between the second communication device and the first communication device using the identifier mapped with the channel providing the connection between the first communication device and the border element at step 828, method 800 ends with the END operation at step 832.

Any of the steps, functions, and operations discussed herein can be performed continuously and automatically.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., a central processing unit (CPU), GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally, or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud," multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a CPU with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of FPGA, ROM, PROM, EPROM, RAM, bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon®610 and 615 with 4G LTE Integration and 64-bit computing, Apple®A7 microprocessor with 64-bit architecture, Apple®M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as a Programmable Logic Device (PLD), a Programmable Logic Array (PLA), a FPGA, a Programmable Array Logic (PAL), special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale integration (VLSI) design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

A neural network, as described herein may comprise layers of logical nodes having an input and an output. If an output is below a self-determined threshold level, the output may be omitted (i.e., the inputs may be within an inactive response portion of a scale and provide no output), if an output is above the threshold, the output may be provided (i.e., the inputs may be within the active response portion of the scale and provide the output). The particular placement of active and inactive delineation may be provided as a step or steps. Multiple inputs into a node may produce a multi-dimensional plane (e.g., hyperplane) to delineate a combination of inputs that are active or inactive.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

The claims presented herein are to be interpreted in light of the specification and drawings presented herein with sufficiently narrow scope such as to preclude any basic mental process that could be performed entirely in the human mind. The claims presented herein are to be interpreted in light of the specification and drawings presented herein with sufficiently narrow scope such as to preclude any process that could be performed entirely by human manual effort.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:

receiving, by a processor of a border element, a Session Initiation Protocol (SIP) connection request from a first communication device of a first network to establish a connection between the first communication device and a second communication device of a second network;

establishing, by the processor, a connection between the first communication device and the border element via a channel;

retrieving, by the processor, an identifier provided in a route header of the SIP connection request identifying the second communication device of the second network;

mapping, by the processor, the identifier with the channel providing the connection between the first communication device and the border element;

receiving, by the processor, a SIP request from the second communication device to the first communication device, wherein the SIP request includes the identifier; and establishing, by the processor, a communication between the second communication device and the first communication device using the identifier mapped with the channel providing the connection between the first communication device and the border element.

2. The method of claim 1, further comprising establishing, by the processor, a connection between the second communication device and the border element.

3. The method of claim 2, wherein the connection between the second communication device and the border element is established using Request for Comment (RFC) 3261.

4. The method of claim 1, wherein the connection between the first communication device and the border element is established using Request for Comment (RFC) 5293.

5. The method of claim 1, wherein the network border is a Session Border Controller (SBC).

6. The method of claim 1, wherein the identifier includes a Server Name Indication (SNI).

7. The method of claim 1, wherein the first network is a private network and the second network is a public network such as the Internet.

8. The method of claim 1, wherein a firewall is provided between the second communication device and the border element and wherein the firewall operates as a Network Address Translation (NAT) device that modifies an Internet Protocol (IP) address of the first communication device.

9. A computer system, comprising:

a processor; and a computer-readable storage medium storing computer-readable instructions, which when executed by the processor, cause the processor to execute a border element that:

receives a Session Initiation Protocol (SIP) connection request from a first communication device of a first network to establish a connection between the first communication device and a second communication device of a second network;

establishes a connection between the first communication device and the border element via a channel;

retrieves an identifier provided in a route header of the SIP connection request identifying the second communication device of the second network;

maps the identifier with the channel providing the connection between the first communication device and the border element;

receives a SIP request from the second communication device to the first communication device, wherein the SIP request includes the identifier; and establishes a communication between the second communication device and the first communication device using the identifier mapped with the channel providing the connection between the first communication device and the border element.

10. The computer system of claim 9, wherein the computer-readable instructions, when executed by the processor, further cause the processor to execute the border element that establishes a connection between the second communication device and the border element.

11. The computer system of claim 10, wherein the connection between the second communication device and the border element is established using Request for Comment (RFC) 3261.

12. The computer system of claim 9, wherein the connection between the first communication device and the border element is established using Request for Comment (RFC) 5293.

13. The computer system of claim 9, wherein the border element is a Session Border Controller (SBC).

14. The computer system of claim 9, wherein the identifier includes a Server Name Indication (SNI).

15. The computer system of claim 9, wherein the first network is a private network and the second network is a public network such as the Internet.

16. The computer system of claim 9, wherein a firewall is provided between the second communication device and the border element and wherein the firewall operates as a Network Address Translation (NAT) device that modifies an Internet Protocol (IP) address of the first communication device.

17. A computer program product, comprising:

a computer-readable storage medium having computer-readable program code embodied therewith, the computer-readable program code configured, when executed by a processor, to:

receive a Session Initiation Protocol (SIP) connection request from a first communication device of a first network to establish a connection between the first communication device and a second communication device of a second network;

establish a connection between the first communication device and a border element via a channel;

retrieve an identifier provided in a route header of the SIP connection request identifying the second communication device of the second network;

map the identifier with the channel providing the connection between the first communication device and the border element;

receive a SIP request from the second communication device to the first communication device, wherein the SIP request includes the identifier; and establish a communication between the second communication device and the first communication device using the identifier mapped with the channel providing the connection between the first communication device and the border element.

18. The computer program product of claim 17, wherein the computer-readable program code, when executed by the processor, further cause the processor to execute the border element that establishes a connection between the second communication device and the border element.

19. The computer program product of claim 18, wherein the connection between the second communication device and the border element is established using Request for Comment (RFC) 3261.

20. The computer program product of claim 17, wherein the connection between the first communication device and the border element is established using Request for Comment (RFC) 5293.

* * * * *